(12) United States Patent
Chang

(10) Patent No.: US 6,874,397 B2
(45) Date of Patent: Apr. 5, 2005

(54) CIRCULAR CUTTER WITH A FRICTION-PROVIDED PLATE

(75) Inventor: Chiu-Tsun Chang, Taichung (TW)

(73) Assignee: P&F Brother Industrial Corporation, Taichung (TW)

( * ) Notice: Subject to any disclaimer, the term of this patent is extended or adjusted under 35 U.S.C. 154(b) by 99 days.

(21) Appl. No.: 10/431,730

(22) Filed: May 8, 2003

(65) Prior Publication Data
US 2004/0221701 A1 Nov. 11, 2004

(51) Int. Cl.[7] .............................. B26D 1/14; B27B 27/06
(52) U.S. Cl. ...................... 83/471.3; 83/473; 83/477.1; 83/490; 83/581
(58) Field of Search ................................ 83/471.3, 473, 83/478, 483, 490, 581; 403/1, 187, 190, 230, 403/384; 292/306; 24/127; 74/502.3; 16/417; 248/121–126, 200, 200.1, 231.9, 251

(56) References Cited

U.S. PATENT DOCUMENTS

| | | | | | |
|---|---|---|---|---|---|
| 4,355,557 | A | * | 10/1982 | Mecsey | 83/565 |
| 5,623,860 | A | * | 4/1997 | Schoene et al. | 83/471.3 |
| 5,778,747 | A | * | 7/1998 | Chen | 83/471.3 |
| 6,173,635 | B1 | * | 1/2001 | Chang | 83/471.3 |

* cited by examiner

Primary Examiner—Allan N. Shoap
Assistant Examiner—Carolyn Blake
(74) Attorney, Agent, or Firm—Trop, Pruner & Hu, P.C.

(57) ABSTRACT

A circular cutter includes a bracket-mounting part integrally formed with a base plate as a single piece. The bracket-mounting part defines a first abutting face. A bracket is pivoted to the bracket-mounting part through a pivot shaft. The bracket defines a second abutting face, and is formed with an arcuate slot. A cutter-holding arm is pivoted to the bracket. A friction-providing plate is interposed between the first and second abutting faces. A screw rod extends through the arcuate slot and the friction-providing plate to threadedly engage an inner thread in the bracket-mounting part.

2 Claims, 7 Drawing Sheets

CIRCULAR CUTTER WITH A FRICTION-PROVIDED PLATE

BACKGROUND OF THE INVENTION

1. Field of the Invention

The present invention relates to a circular cutter, more particularly to a circular cutter with a tiltable cutter-holding arm which is pivoted to a bracket-holding part of a base plate through a friction-providing plate.

2. Description of the Related Art

Referring to FIG. 1, a conventional circular cutter is shown to include a base plate 10, a bracket-mounting element 12, a pivot shaft 132, a bracket 13, a cutter-holding arm 14, and a cutter-tilting lock.

The base plate 10 is made from aluminum, and is formed with a recess 111 and a pair of screw holes 112. The bracket-mounting element 12 is made from cast iron, is disposed in the recess 111, and is fixed to the base plate 10 through threaded engagement between two locking bolts 121 and the screw holes 112 in the base plate 10. The bracket-mounting element 12 is formed with an inner thread, and defines a first abutting face that is transverse to the base plate 10. The bracket 13 is pivoted to the bracket-mounting element 12 through the pivot shaft 132, which extends in a transverse direction relative to the first abutting face of the bracket-mounting element 12. The bracket 13 defines a second abutting face that confronts the first abutting face of the bracket-mounting element 12, and is formed with an arcuate slot. The cutter-holding arm 14 is pivoted to two lugs 131 of the bracket 13. A locking bolt 15 of the cutter-tilting lock extends through the arcuate slot in the bracket 13 and engages threadedly the inner thread of the bracket-mounting element 12 in such a manner that tightening of the locking bolt 15 results in tight abutment between the first abutting face of the bracket-mounting element 12 and the second abutting face of the bracket 13, thereby preventing rotation of the bracket 13 about the pivot shaft 132, and that loosening of the locking bolt 15 results in disengagement between the first and second abutting faces, thereby permitting adjustment of the cutter-holding arm 14 to a desired position relative to the base plate 10.

One disadvantage of the conventional circular cutter resides in that since the base plate 10 is made from aluminum, which is relatively soft, it is not strong enough to hold the bracket-mounting element 12 thereon. Besides, constant vibration of the bracket 13 relative to the bracket-mounting element 12 during cutting operations may result in loosening of the locking bolts 121 and wear of the threads in the screw holes 112.

SUMMARY OF THE INVENTION

Therefore, the object of this invention is to provide a circular cutter, which includes a base plate and a bracket-mounting part that is integrally formed with the base plate as a single piece and that is connected to a bracket through a friction-providing plate so as to overcome the aforesaid disadvantages of the prior art.

According to the present invention, a circular cutter includes: a base unit including a base plate having a top face, and a bracket-mounting part that is integrally formed with the base plate as a single piece and that projects uprightly from the top face, the bracket-mounting part defining a first abutting face that is transverse to the top face, and being formed with an inner thread that extends in a transverse direction relative to the first abutting face; a pivot shaft extending in the transverse direction; a bracket pivoted to the bracket-mounting part through the pivot shaft so as to be rotatable about the pivot shaft, defining a second abutting face that confronts the first abutting face, and formed with an arcuate slot that is disposed adjacent to the inner thread; a cutter-holding arm mounted rotatably on the bracket; a friction-providing plate interposed between the first and second abutting faces; and a cutter-tilting lock including a screw rod that extends through the arcuate slot and the friction-providing plate in the transverse direction to threadedly engage the inner thread in such a manner that the friction-providing plate is tightly clamped between the first and second abutting faces when the screw rod is tightened, thereby preventing rotation of the bracket about the pivot shaft, and that the friction-providing plate is relieved from the clamping action when the screw rod is loosened, thereby permitting rotation of the bracket about the pivot shaft.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
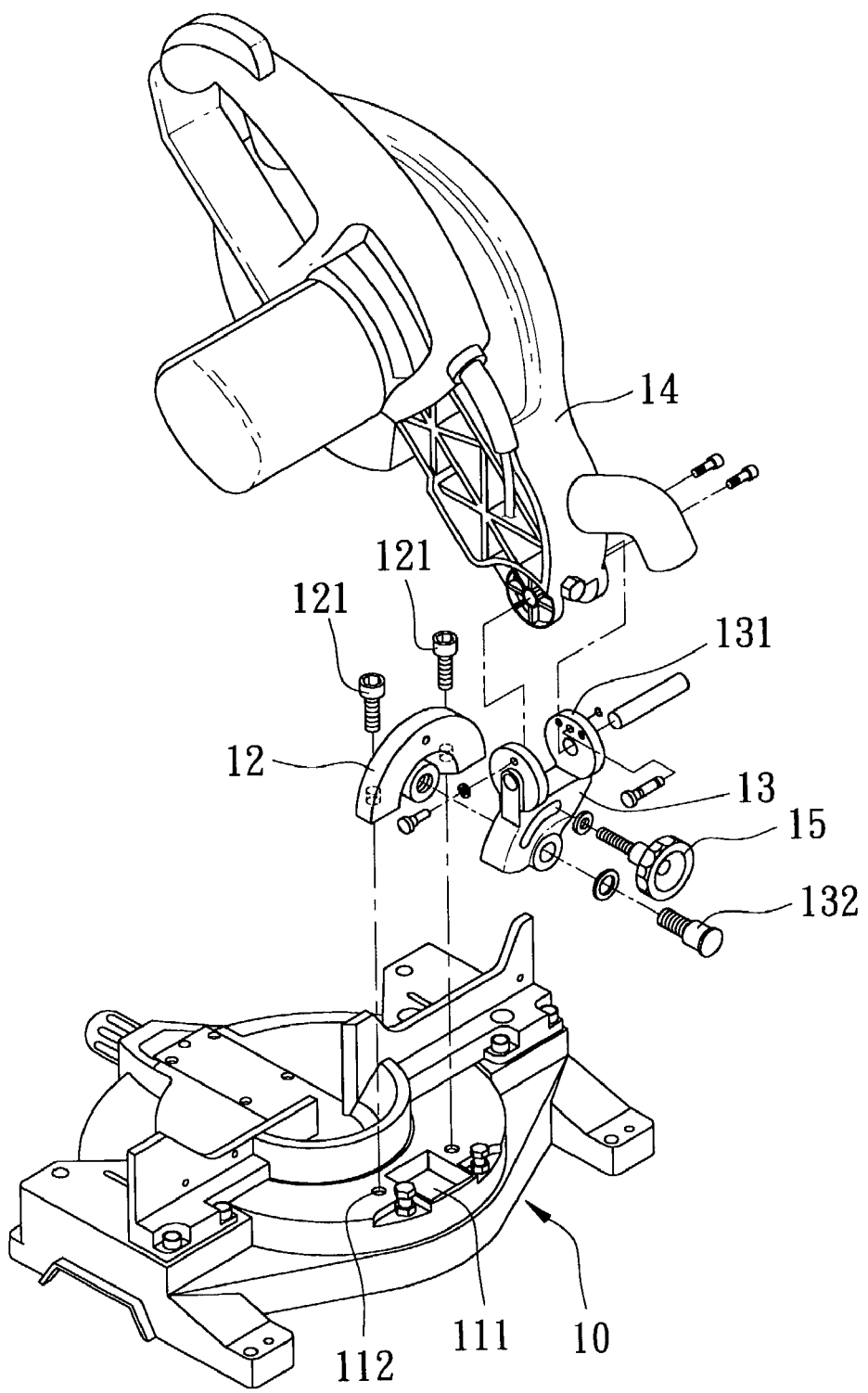
FIG. 1 is an exploded perspective view of a conventional circular cutter.
Figure 2:
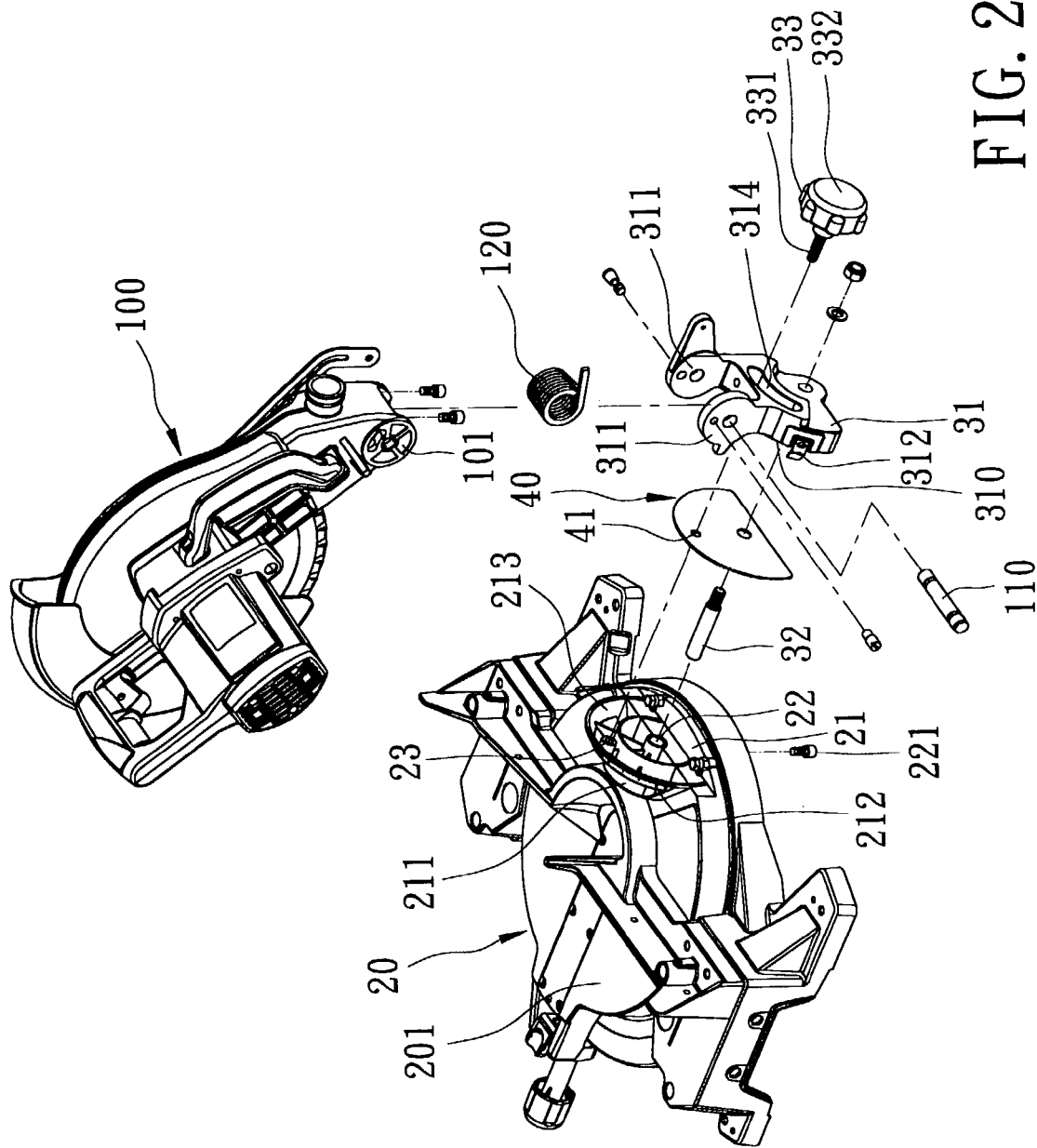
FIG. 2 is an exploded perspective view of the preferred embodiment of a circular cutter according to the present invention.
Figure 3:
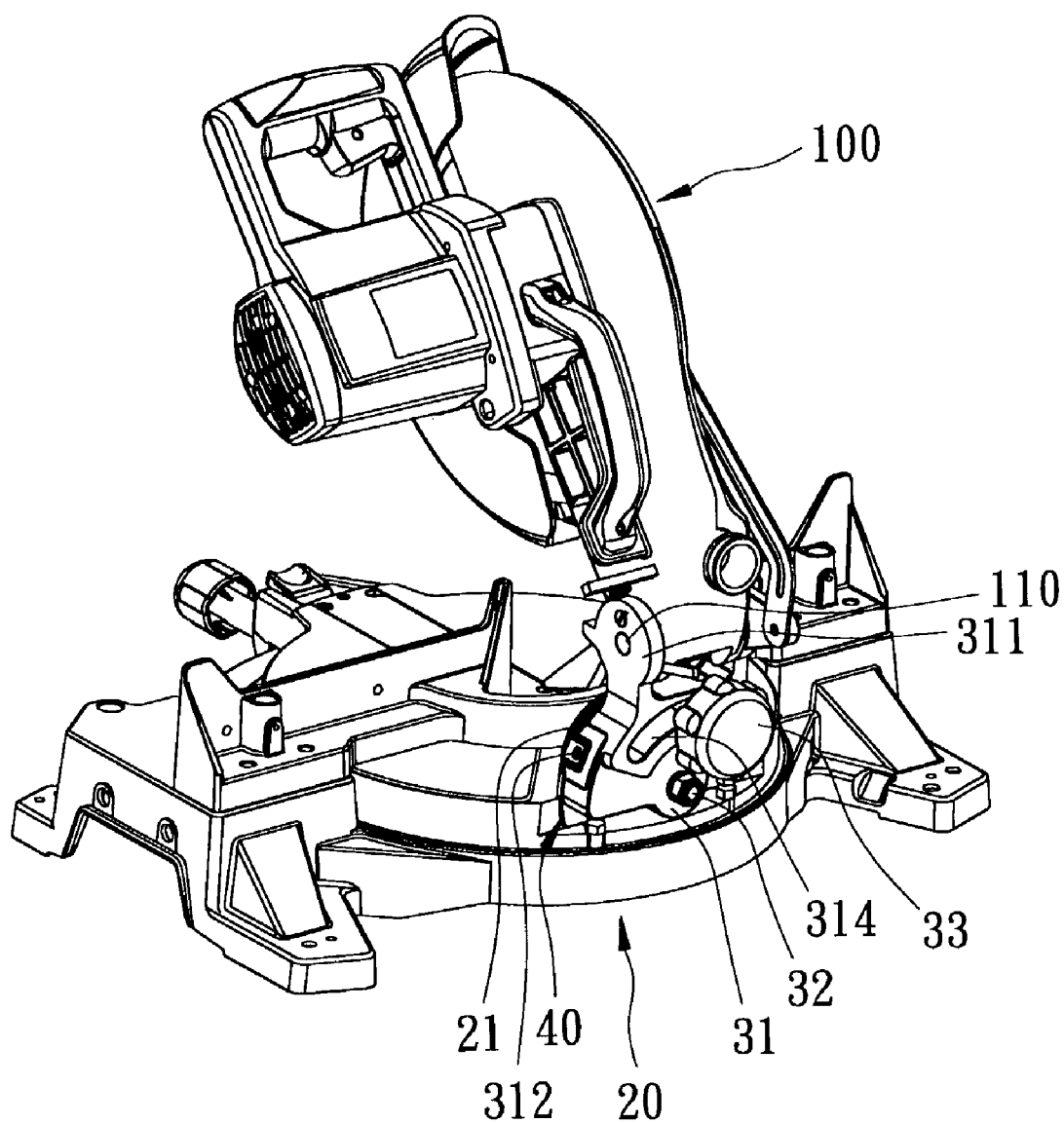
FIG. 3 is a perspective front view of the preferred embodiment.
Figure 4:
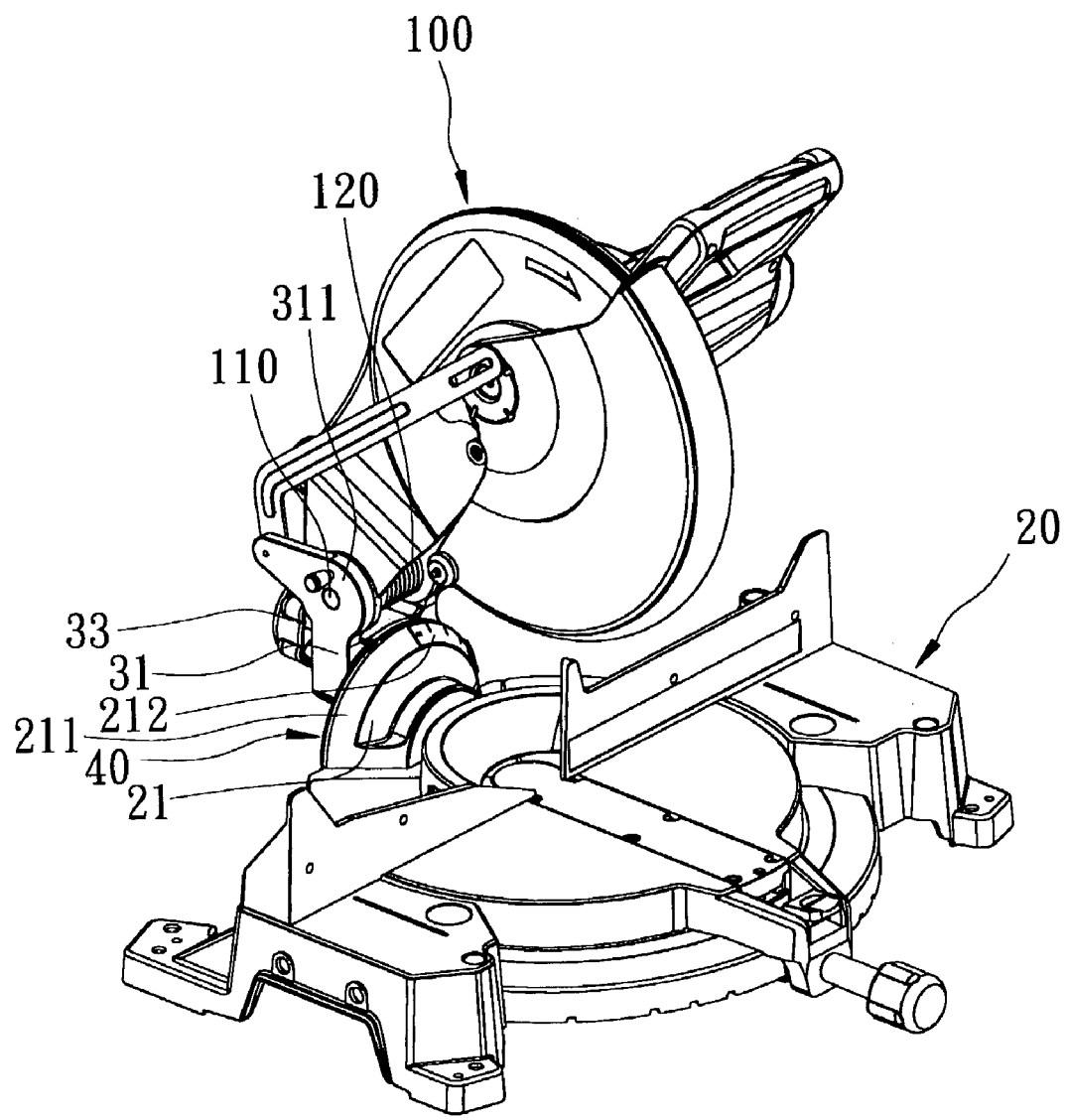
FIG. 4 is a perspective rear view of the preferred embodiment.

Referring to FIGS. 2 to 4, the preferred embodiment of a circular cutter according to the present invention is shown to include a base unit, a pivot shaft 32, a bracket 31, a cutter-holding arm 100, a sector-shaped friction-providing plate 40 and a cutter-tilting lock 33.

As illustrated, the base unit includes a base plate 20 having a top face 201, and a bracket-mounting part 21 that is integrally formed with the base plate 20 as a single piece and that projects uprightly from the top face 201. The bracket-mounting part 21 defines a first abutting face 213 that is transverse to the top face 201. The bracket-mounting part 21 is formed with an inner thread 23 that extends in a transverse direction relative to the first abutting face 213.

The pivot shaft 32 extends in the transverse direction.

The bracket 31 is pivoted to the bracket-mounting part 21 through the pivot shaft 32 so as to be rotatable about the pivot shaft 32, and defines a second abutting face 310 that confronts the first abutting face 213 of the bracket-mounting part 21. The bracket 31 is formed with an arcuate slot 314 that is disposed adjacent to the inner thread 23 of the bracket-mounting part 21.

The cutter-holding arm 100 has a lower end 101 pivoted to two lugs 311 of the bracket 31 through a pivot shat 110. A torsional spring 120 is disposed between the bracket 31 and the cutter-holding arm 100 for urging the cutter-holding arm 100 away from the base plate 20.

The friction-providing plate 40 is formed with a through hole for extension of the pivot shaft 32 therethrough, and is interposed between the first abutting face 213 of the bracket-mounting part 21 and the second abutting face 310 of the bracket 31.

Figure 7:
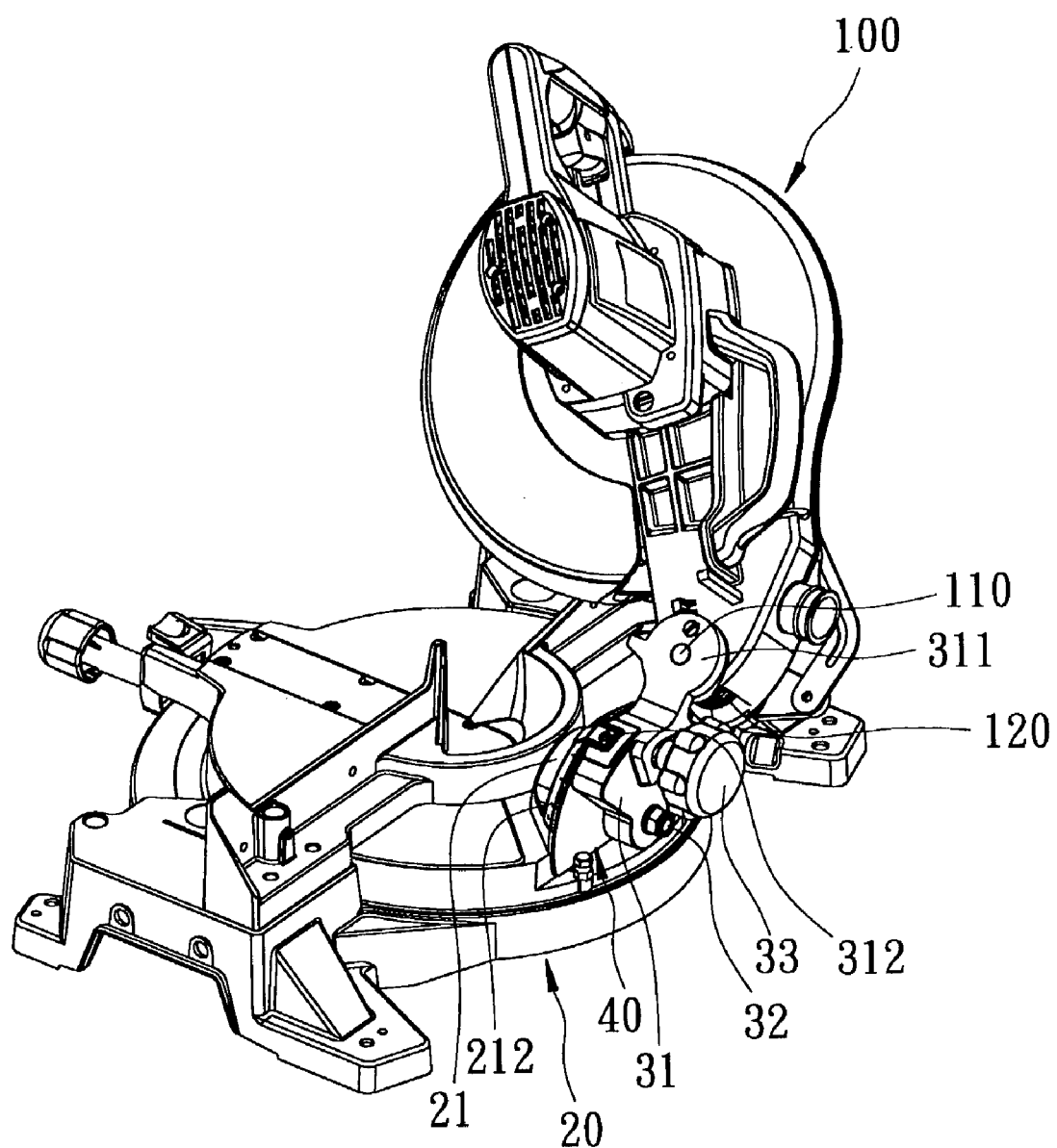
FIG. 7 is a perspective front view of the preferred embodiment, illustrating how the cutter-holding arm is disposed in a tilted position relative to the base plate.

The cutter-tilting lock 33 includes a screw rod 331 that extends in the transverse direction through the arcuate slot 314 in the bracket 31 and a hole 41 in the friction-providing plate 40 to threadedly engage the inner thread 23 in such a manner that the friction-providing plate 40 is tightly clamped between the first abutting face 213 of the bracket-mounting part 21 and the second abutting face 310 of the bracket 31 when the screw rod 331 is tightened, thereby preventing rotation of the bracket 31 about the pivot shaft 32 and consequently disposing the cutter-holding arm 100 at a desired position relative to the base plate 20, and that the friction-providing plate 40 is relieved from the clamping action when the screw rod 331 is loosened, thereby permitting rotation of the bracket 31 about the pivot shaft 32. Under this condition, the position of the cutter-holding arm 100 can be adjusted, as best shown in FIG. 7. A scale 212 is fixed on an outer surface 211 of the bracket-mounting part 21. The bracket 31 is provided with a scale pointer 312 projecting outwardly therefrom in the transverse direction to indicate a tilting angle of the cutter-holding arm 100 relative to the pivot shaft 32. A turning knob 332 is preferably fixed to one end of the screw rod 33 to facilitate turning of the screw rod 33.

Figure 5:
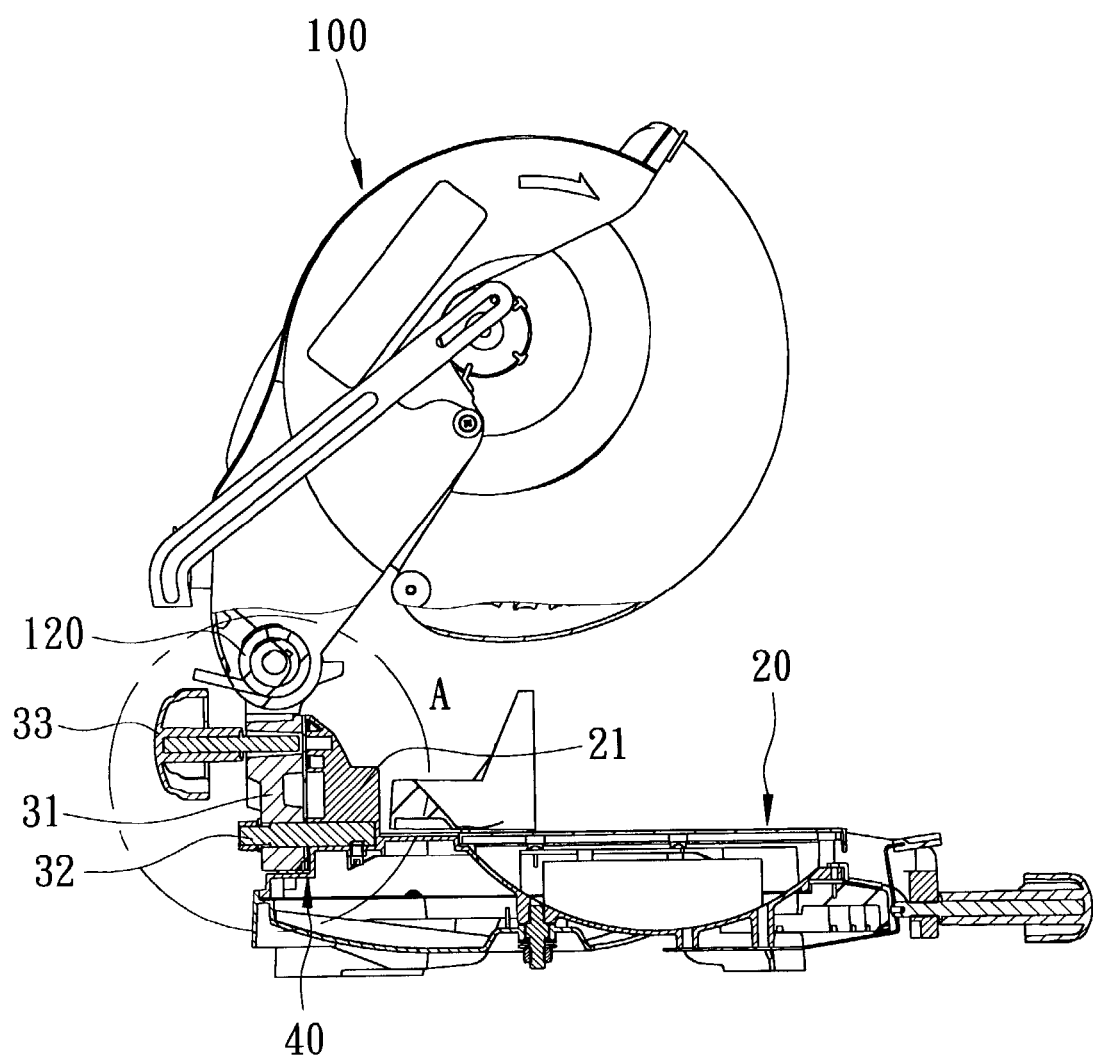
FIG. 5 is a partly cutaway, partly sectional view of the preferred embodiment.
Figure 6:
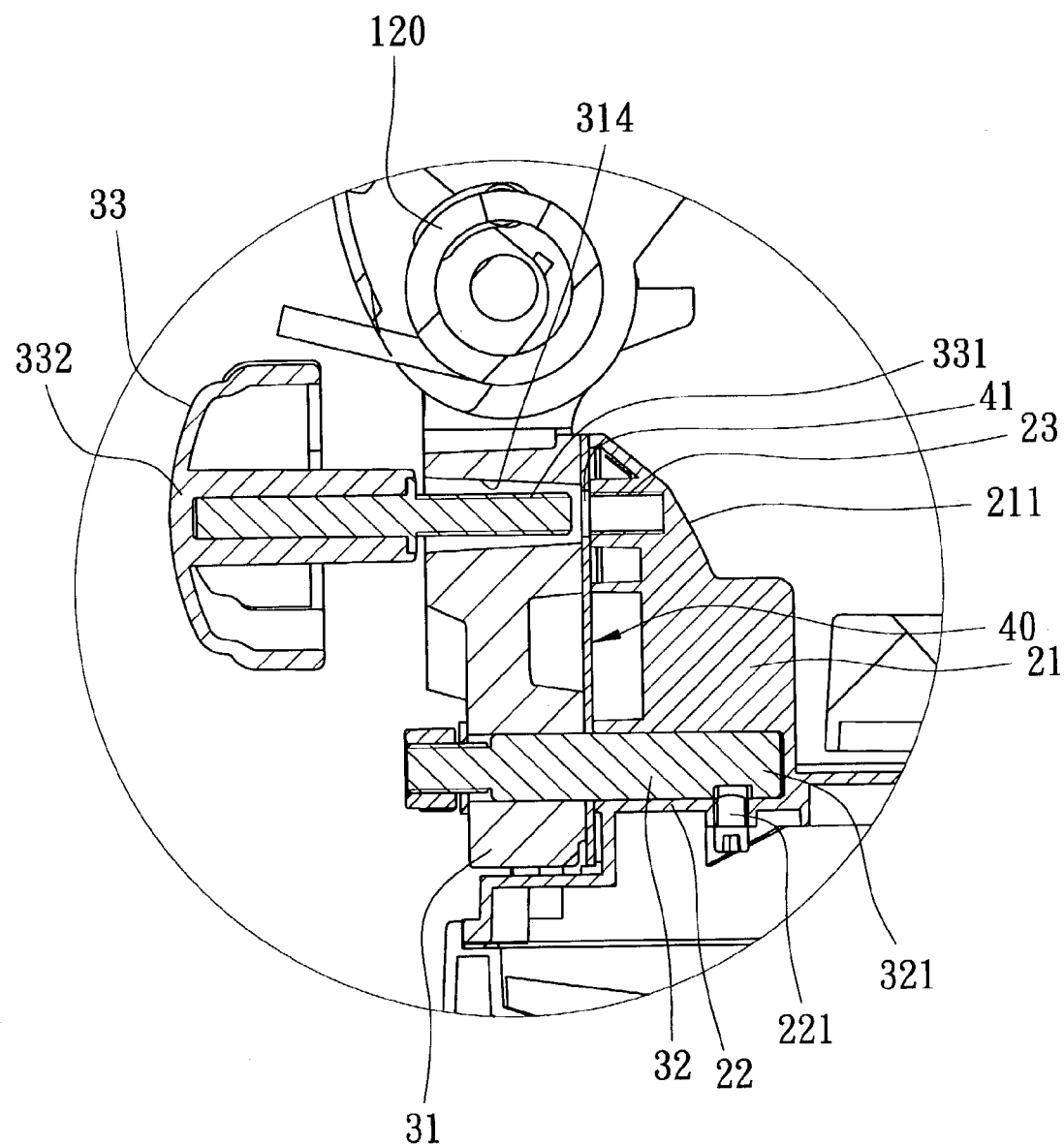
FIG. 6 is an enlarged view of the circled portion (A) shown in FIG. 5, illustrating how a cutter-holding arm is pivoted to a bracket that is screwed to a base plate.

In this preferred embodiment, the friction-providing plate 40 is made from steel. The bracket 31 is made from iron by casting. The base plate 20 is made from aluminum by casting. The bracket-mounting part 21 is preferably formed with a tube that defines a shaft-receiving bore 22 which extends in the transverse direction (see FIG. 2). One end of the pivot shaft 32 is inserted into the shaft-receiving bore 22. A locking bolt 221 extends through the base plate 20 and into the shaft-receiving bore 22 to engage a recess 321 in the pivot shaft 32 so as to prevent untimely detachment of the pivot shaft 32 from the bracket-mounting part 21 (see FIGS. 5 and 6).

Since the bracket-mounting part 21 is integrally formed with the base plate 20 as a single piece and since the friction-providing plate 40 is interposed between the bracket 31 and the bracket-mounting part 21, the bracket 31 can be locked firmly to the bracket-mounting part 21 through the screw rod 33.

With this invention thus explained, it is apparent that numerous modifications and variations can be made without departing from the scope and spirit of this invention. It is therefore intended that the invention be limited only as indicated in the appended claims.

I claim:
1. A circular cutter comprising:
a base unit including a base plate having a top face, and a bracket-mounting part that is integrally formed with said base plate as a single piece and that projects uprightly from said top face, said bracket-mounting part defining a first abutting face that is transverse to said top face, and being formed with an inner thread that extends in a transverse direction relative to said first abutting face;
a pivot shaft extending in said transverse direction;
a bracket pivoted to said bracket-mounting part through said pivot shaft so as to be rotatable about said pivot shaft, defining a second abutting face that confronts said first abutting face, and formed with an arcuate slot that is disposed adjacent to said inner thread;
a cutter-holding arm mounted rotatably on said bracket;
a friction-providing plate interposed between said first and second abutting faces; and
a cutter-tilting lock including a screw rod that extends through said arcuate slot and said friction-providing plate in said transverse direction to threadedly engage said inner thread in such a manner that said friction-providing plate is tightly clamped between said first and second abutting faces when said screw rod is tightened, thereby preventing rotation of said bracket about said pivot shaft, and that said friction-providing plate is relieved from the clamping action when said screw rod is loosened, thereby permitting rotation of said bracket about said pivot shaft.

2. The circular cutter as defined in claim 1, wherein said friction-providing plate is made from steel, said bracket being made from iron by casting, said base plate being made from aluminum by casting.

* * * * *